(12) United States Patent
Sahm et al.

(10) Patent No.: US 6,729,813 B2
(45) Date of Patent: May 4, 2004

(54) SPINDLEHEAD FOR TOOLS

(75) Inventors: Detlef Sahm, Lichtenwald (DE); Rolf Wezel, Metzingen (DE)

(73) Assignee: Sauter Feinmechanik GmbH, Metzingen (DE)

( * ) Notice: Subject to any disclaimer, the term of this patent is extended or adjusted under 35 U.S.C. 154(b) by 29 days.

(21) Appl. No.: 10/132,710

(22) Filed: Apr. 26, 2002

(65) Prior Publication Data

US 2002/0176758 A1 Nov. 28, 2002

(30) Foreign Application Priority Data

May 2, 2001 (DE) .......................... 101 21 694

(51) Int. Cl.[7] .................. B23C 9/00; B23Q 11/10; B23Q 11/12
(52) U.S. Cl. .................. 409/136; 409/135; 409/230; 409/231; 408/56
(58) Field of Search ................. 409/135, 136, 409/230, 231, 232; 408/56, 57

(56) References Cited

U.S. PATENT DOCUMENTS

| | | | | |
|---|---|---|---|---|
| 2,933,321 A | * | 4/1960 | Cascone | 408/57 |
| 2,937,029 A | * | 5/1960 | Colby | 279/20 |
| 3,024,030 A | * | 3/1962 | Koch | 279/20 |
| 4,945,620 A | * | 8/1990 | Dassler | 29/39 |
| 5,487,631 A | * | 1/1996 | Child | 409/231 |
| 5,613,812 A | * | 3/1997 | Levan et al. | 409/136 |
| 5,758,995 A | * | 6/1998 | Sahm | 409/136 |
| 6,413,025 B1 | * | 7/2002 | Lind | 409/135 |
| 6,497,538 B1 | * | 12/2002 | Lind | 409/135 |
| 6,568,886 B1 | * | 5/2003 | Lind | 409/136 |

FOREIGN PATENT DOCUMENTS

| | | |
|---|---|---|
| DE | 3824427 | 1/1990 |
| DE | 4226922 | 2/1994 |
| DE | 19516986 | 11/1996 |
| EP | 000635332 A1 * | 1/1995 |
| EP | 001245329 A1 * | 10/2002 |

OTHER PUBLICATIONS

DIN 69880, Mar. 2000.

* cited by examiner

*Primary Examiner*—A. L. Wellington
*Assistant Examiner*—Erica E Cadugan
(74) *Attorney, Agent, or Firm*—Roylance, Abrams, Berdo & Goodman, LLP

(57) ABSTRACT

A spindlehead for tools is insertable into a tool disk with holders provided for such spindleheads. A spindle holds the shank of the tool in its chuck at its front end section, and is rotatably mounted by a spindle bearing in a spindlehead housing. A coolant feed extends at least in part in the spindlehead housing to convey coolant to the tool via at least one coolant channel and an internal coolant feed line in the spindle. A sealing device with a throttling point is separated form parts of a drainage channel. The sealing device has at least one sealing ring enclosing the spindle. The sealing ring is longitudinally movable in the spindlehead housing coaxially with the spindle axis. After longitudinal movement into a sealing position, the sealing ring separates the internal coolant feed line from the associated parts of the drainage channel up to a specifiable leakage amount. The accuracy of machining with the tool may be increased and the installation space available can be better used.

10 Claims, 1 Drawing Sheet

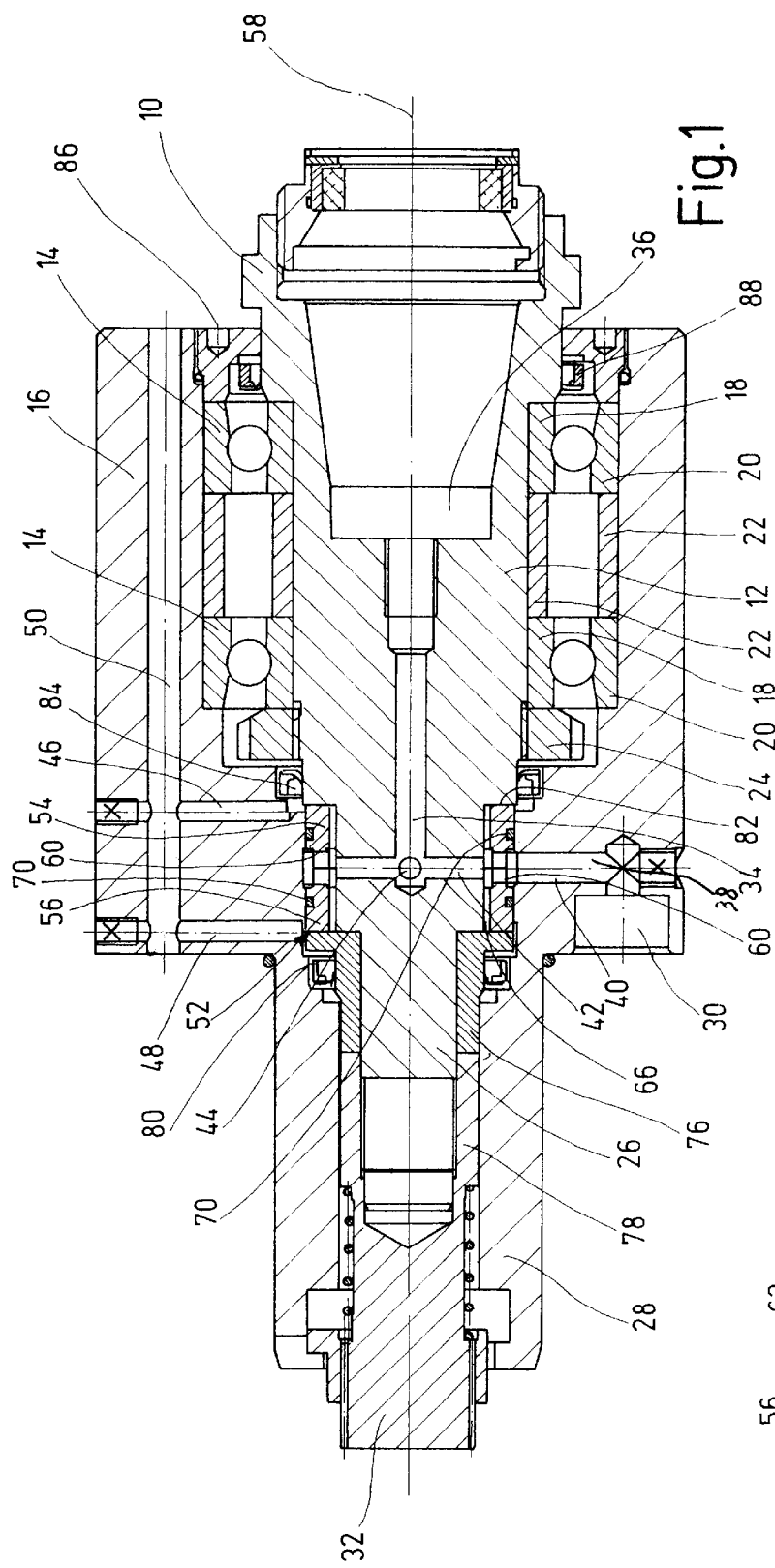
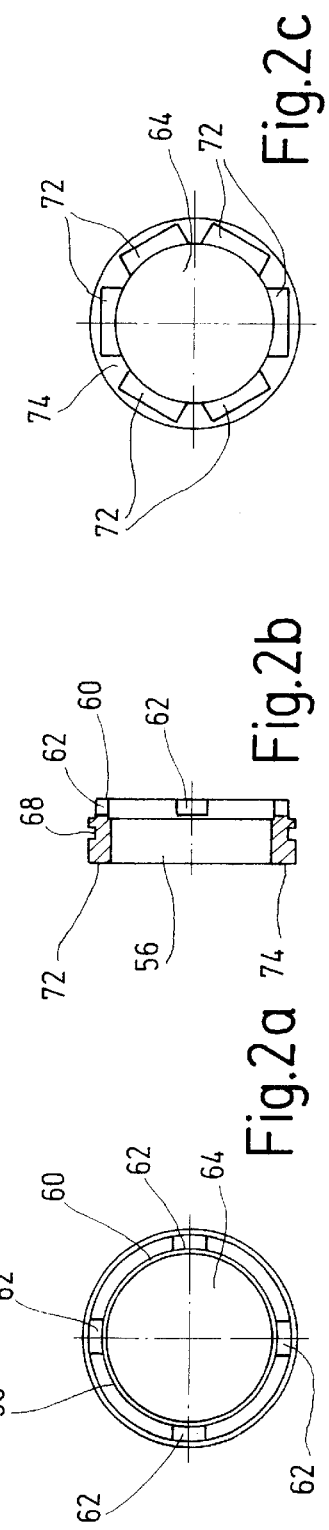
Fig.1
Fig.2a  Fig.2b  Fig.2c

SPINDLEHEAD FOR TOOLS

FIELD OF THE INVENTION

The present invention relates to a spindlehead for tools which may be inserted into a tool disk with tool carriers provided for this purpose, and to chucking means for the spindle holding the shank of the tool in a second end section adjoining the first end section. The first end section is rotatably mounted in the spindlehead housing with a spindle bearing. A coolant feed line extends at least in part in the spindlehead housing. Coolant is transferred over at least one coolant channel which represents an internal coolant feed line for the tool involved. The internal coolant feed line is separated from a drainage channel by a sealing device with a throttle point. The sealing device has at least one sealing ring which encloses the spindle.

BACKGROUND OF THE INVENTION

DE 195 16 986 C2 discloses a spindlehead, for tools which may be inserted into a tool disk of a turret with tool insertion holes as specified in DIN 69880 [German Industrial Standard 69880] (especially Part 6, March 2000, pages 2 and 4).

In addition, coolant transfer occurs in a spindlehead cover provided on the tool side in which an annular groove is provided. A coolant feed channel discharges into the groove. Through that channel, coolant is delivered internally for a particular tool. In the conventional solution, the coolant transfer point is situated upstream from the spindle bearing. The annular groove is open up to the first end section and is provided with a connecting channel. One end of the connecting channel discharges into the annular zone of the first end zone surface oriented toward the annular groove. The other end of the connecting channel discharges into a chucking means space of the spindle with which the inlet opening provided in the shank end of the coolant channel extending through the tool communicates. The annular groove itself is sealed from the exterior by an external split seal and from the interior in the direction of the spindle bearing by an internal split seal. Both the external and the internal split seals are bounded by the external surface of the spindle and the internal surface of the spindlehead. This arrangement results in a creation of a spindlehead for tools with internal coolant feed which takes up little installation space on the tool disk. In addition, reliable sealing is ensured which in no way exposes the spindle bearing to damage by the coolant.

DE 38 24 427 A1 discloses a machine tool with a spindlehead carrier and a spindlehead mounted on this carrier and provided with a spindle. The drive shaft mounted in the spindlehead carrier is connected to the spindle by gears, bevel gears in particular. In the area of the gears, an oil circulation space for lubrication of the gears is provided. The oil circulation space is sealed from the stationary component of the spindlehead by sealing elements. Compressed air is applied by compressed air feed lines feeding compressed air via throttling ports to the front sealing surfaces of the sealing elements operating in conjunction with opposite rotating sealing surfaces. The pressure relationships and the line cross-sections are selected such that a sealing gap is present for the purpose of contact-free sealing between the rotating opposite sealing surfaces and the sealing surfaces of the sealing elements. Hence, the conventional solution achieves oil lubrication through an oil circulation space. Escape of oil at an undesirable location is prevented by sealing of the oil circulation space by compressed air. The compressed air introduced into the oil circulation space and the resulting excess pressure make certain that the oil lubricant will reach the gears to be lubricated. The oil circulation space is then filled with an oil and air mixture and the gears need not operate entirely in oil. The sealing gap in question of the respective sealing elements thus serves the purpose of delivery of lubricant for the gearing referred to.

DE 42 26 922 A1 discloses a generic spindlehead having a coolant device for supply of the respective boring and/or cutting tools with coolant and/or lubricant. The spindle is provided with an axial channel element fed via an opening in a stationary feed device for transfer of the coolant and/or lubricant to the tool/working area. The feed device and the spindle mesh to form a split seal coaxially. In the conventional solution, leaks through the split seal are removed by a pressure relief space so as to flow to the exterior (virtually free of pressure). This pressure relief space is sealed from, the spindlehead housing downstream on the bearing side by another split seal. The coolant feed proper further requires delivery of compressed air for the conventional sealing solution. Compressed air is applied to this split seal to support the sealing effect. The respective conventional solution in this embodiment requires much installation space and is cost-intensive in application and in maintenance.

SUMMARY OF THE INVENTION

Objects of the present invention are to provide and optimize a spindlehead, and in particular to increase the accuracy of machining with the tool, achieve better use of available installation space, and lower manufacturing costs an d potential maintenance costs.

The foregoing objects are basically obtained according to the present invention by the sealing ring being guided coaxially and longitudinally so as to be displaceable relative to the spindle axis in the spindlehead housing. After longitudinal displacement into a sealing position, the sealing ring separates the interior coolant feed, including a prescribable leakage amount, from the parts of the drainage channel to be associated with the feed. The interior coolant feed from the area of the pressurized means for the shank of the tool may be transferred back in the opposite direction into the spindlehead housing. The spindle bearing itself can then move further forward into the area of the pressurized means, so that the tool is better guided and supported by the spindle carrier and the spindle bearing. This situation definitely favors machining accuracy.

Since the internal coolant feed may now take place exclusively centrally by way of the sealing device and along the longitudinal axis of the spindle, installation space is conserved. In addition, a cost-effective solution is achieved, one which also noticeably lowers any subsequent maintenance costs.

Since the respective sealing ring of the sealing device may be displaced longitudinally, a dynamic sealing is achieved which is automatically adapted to prescribed machining situations such as delivery of coolant lubricants, speed of spindle unit, etc. Because of the floating layout of the respective sealing ring, sealing is effected as a function of the pressure relationships and the quantity of coolant to be supplied. As a result, the optionally aggressive coolant cannot reach places which might be damaged by it, ones in the form of the spindle bearing, for example.

In a preferred embodiment of the spindlehead of the present invention, the sealing device has two sealing rings whose sealing surfaces are positioned opposite and against the spindlehead housing with their front sides facing away from each other. This permits a layout in which the respective sealing ring is guided over its external circumference along the spindlehead housing and can slide, generating little friction, on a cushion of coolant produces internal feed of coolant through the spacing between the respective sealing ring and spindle. Sealing with a prescribed amount of leakage can then be effected by way of the front side of the sealing ring in question facing the spindlehead housing.

In another preferred embodiment of the spindlehead of the present invention, the two sealing rings are connected to the coolant feed line on their sides facing each other. An optional axial connection for internal coolant feed is present in the spindle. This arrangement results in good control of the sealing rings by the coolant, and reduces the need for installation space as a result of intervention of the internal coolant feed in the connection option. Space is thereby conserved.

In an especially preferred embodiment of the spindlehead of the present invention, each sealing ring has flexible sealing means on its external circumference. Such means rest on the spindlehead housing, and exert a restoring force on the sealing rings tending to keep the rings together. Dry operation of the spindlehead without coolant is also possible on the basis of this layout. The two sealing rings are held together and kept at a distance from the driven spindle both axially and radially so that to this extent no harmful friction occurs and the spindle can rotate freely in the spindle bearing.

In another preferred embodiment of the spindlehead of the present invention, the throttling point is in the sealing rings in the form of lubricant pouches. The pouches are mounted spaced at a distance from each other on the limiting surface of the sealing rings to allow passage of coolant to form a leakage point. A small leakage flow of coolant is built up by the lubricant pouches; but this flow is in the form of a pressure cushion such that the rotating spindle moves more or less free of friction inside the sealing rings mounted stationarily in the spindlehead housing. A hydrostatic lubrication is thereby achieved. The respective leakage point discharges preferably into the drainage channel. The damage channel emerges from the spindlehead housing into the open through a longitudinal channel section extending parallel to the longitudinal axis of the spindle.

In a preferred embodiment of the spindlehead of the present invention, the sealing device encloses the spindle on the side facing away from the tool shank, beyond the spindle bearing engaging the first end section. The sealing device is thus mounted between a first and a second end section of the actuatable body of the spindle in the spindlehead housing more or less in a manner so as to conserve space.

In another preferred embodiment of the spindlehead of the present invention, additional seals are present upstream and downstream from the spindle in the longitudinal direction. One seals the spindle from the sealing device. In this way lubrication of the spindle through the leakage points is sealed from the other parts of the spindle bearing. This layout preferably also connects the coolant feed radially from the spindlehead housing to a central supply point to conserve space and ensure dependable coolant supply.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevational view in section of a spindlehead according to the present invention;

FIG. 2a is a bottom plan view of the left sealing ring of the sealing device of FIG. 1;

FIG. 2b is a side elevational view in section of the sealing ring of FIG. 2a; and FIG. 2c is a top plan view of the sealing ring of FIG. 2a.

DETAILED DESCRIPTION OF THE INVENTION

The spindlehead shown in FIG. 1 serves as holder of machining tools (not shown). The tools are generally displaced in circulatory rotation for the purpose of machining. For this purpose, a spindle 10 is rotatably mounted in the area of its front end section 12 by two roller bearings 14 in a spindlehead housing 16. Both the inner bushing sleeves 18 and the outer bushing sleeves 20 of the two roller bearings are kept at an axial distance from each other each by a spacing sleeve 22. A lock nut 24, screwed by its internal threading onto a matching external threading on the spindle 10, serves to fasten the two roller bearings 14 by their inner bearing shells 18 on the front end section 12 of the spindle 10. The rear end section 26 of the spindle 10 extends through a hollow shank 28 formed on the spindlehead housing 16. Spindle 10 is connected to one of the front surfaces of housing 16 by way of its free end. A standardized pinhole 30 and the hollow shank 28 are designed so that shank 28 may be introduced into a tool receptacle as specified in DIN 69880. The geared end section 32 of the spindle 10, projecting beyond the hollow, shank 28, may be coupled with a drive shaft (not shown) for driving the spindle 10 and accordingly the tool.

The end section 12 of the spindle 10 contains, for example, a conventional chuck for the shank of a tool (not shown), such as one in the form of a drill. This tool is preferably one with an inner coolant channel. If the shank of the tool has been fully inserted into the chuck and connected to the spindle 10 by being rigidly and tightly connected to the chuck, the front end of an internal coolant feed channel or line 34 communicates with a central chucking space 36. In this manner, when a tool is inserted, a fluid conducting connection exists between the internal coolant feed line 34 and the internal coolant channel of the tool. The tool can then be suitably supplied with coolant during machining.

The coolant feed line 34 in question is part of an internal coolant transmission system 38 having several sections of coolant channels or channel sections 40, 42, 44. The internal coolant transmission system 38 with its associated channel sections 42 and 44 is in turn separated from the drainage system 46, 48, and 50 by a sealing device with throttling point, designated as a whole as 52. The sealing device 52, essentially comprises two sealing rings 54 and 56. Sealing ring 56, shown on the left in FIG. 1, is illustrated in different views in FIGS. 2a, 2b, and 2c. In addition, the drainage system, and thus, the drainage channel with its sections 46, 48, and 50 are under ambient pressure.

The two sealing rings 54 and 56 enclose the actuatable spindle 10 and are arranged coaxially with the spindle axis 58, and are displaceable longitudinally in the spindlehead housing 16. In addition, the two sealing rings 54 and 56 are connected on their sides 60 facing each other to the coolant transmission system at coolant channel section 40. Coolant channel section 40 discharges into the connection points 62 of the respective ring 54, 56, and is connected to the interior 64 of the respective sealing ring 54, 56 so as to conduct fluid. A radial gap 66 is maintained while the spindle element of the spindle 10 extends through the ring interior 64.

The four transverse channel sections, in the form of the channel sections 42 and 44, extend entirely through the spindle 10, and discharge in an area at their ends into the interior coolant feed line 34 for the tool. The coolant channels 42 and 44 extend through the spindle 10 transversely to the longitudinal spindle axis 58. Internal coolant feed line 34 extends along the spindle axis 58 centrally inside the spindle element. Supply of the internal coolant feed line 34 then takes place by way of coolant channel 40 carrying fluid, via the annular or radial gap 66.

The respective sealing ring 54, 56 is provided on its external circumference with an engagement groove 68 (FIG. 2b) in which a conventional sealing O-ring 70 is engaged as flexible sealing means. When the two sealing rings 54, 56 are installed, they rest on or engage the spindlehead housing 16 in such that a restoring force is applied to the sealing rings 54, 56. The restoring force tends to keep these rings together by way of the respective side 60. The throttling point of the sealing device 52 is made up of lubricant pouches 72 in the individual sealing rings 54, 56. The pouches are in the form of recesses in the planar frontal side 74 and form a fluid-conducting connection, coolant-conducting in particular, in the direction of the longitudinal spindle axis 58 with the radial gap 66 or with the interior 64 of the respective sealing ring 54, 56.

As is to be seen especially in FIG. 2c, there are six lubricant pouches 72 mounted diametrically opposite each other present for each sealing ring 54, 56. The two frontal sides 74, spaced a distance from each other, form limiting surfaces. As viewed in FIG. 1, the left limiting surface 74 of the sealing ring 56 adjoins the flange-like widening of a bushing 76. Bushing 76 is held in position on the second end section 26 of the spindle 10 by a threaded element 78. The free spacing of the sealing rings 54 and 56 relative to each other and to the first end section 12 of the spindle 10 may be adjusted by modifying the feed travel of the bushing 76.

In addition, the bushing 76 is mounted on its external circumference in the spindlehead housing 16 by of another seal 80. Since the two sealing rings 54 and 56 thus have prescribable play axially between the flange-like widening of the bushing 76 and a mounting shoulder 82 of the spindle 10, the lubricant pouches 72 form, by the respective limiting surface 74 of the sealing rings 54 and 56, a desirable leakage point. Through that leakage point, coolant delivered through the radial gap 66 may be discharged into the drainage channels 46, 48 and 50. An additional second seal 84 is present between spindlehead housing 16 and first end section 12 of the spindle 10 so that no coolant can flow in the direction of the spindle bearing 14 through the leakage point, which coolant discharges into the coolant channel 46.

The operation of the sealing device 52 will now be described in detail on the basis of a practical embodiment. To guarantee operation, first, the coolant channel section 40 is to be connected to a coolant supply via the pin hole 30. Once connection has been made to the coolant feed device and suitable pressure has been built up in the coolant channel 40, the sealing rings 54 and 56 held together by the sealing O-rings 70 are moved apart. Additional fluid pressure is built up by the radial gap 66 and is then established in the lubricant pouches 72 of the limiting surfaces 74. Because of the floating arrangement of the sealing rings 54 and 56 in the spindlehead housing 16, a dynamic equilibrium is established for these rings. They are conducted more or less free of friction either against each other or against the bushing 76 or the support shoulder 82 of the spindle 10. Consequently, the spindle 10 can transfer high speeds and torque to the machining tool without exertion of a harmful effect on the sealing device 52.

The leakage flow of coolant can be forwarded via drainage channel sections 46, 48, and 50 and then be discharged into the open. Additional longitudinal coolant channels (not shown) may be present to feed large amounts of coolant under pressure directly to the tool from the exterior. If the coolant feed through channel section 40 is interrupted, the two sealing O-rings 70 force the sealing rings 54 and 56 back. In addition to the radial gap 66, an axial gap is formed between the respective limiting surfaces 74 and the facing sides of bushing 76 and bearing shoulder 82 of the spindle 10. In this configuration, it would be possible to carry out dry machining with the spindlehead, since the spindle 10 is then controlled to be free of contact in the sealing rings 52, 54. A process of hydrostatic lubrication is otherwise accomplished with this layout.

Since all the sealing systems are mounted behind the spindle bearing 14, the bearing may be mounted far forward in the spindlehead housing 16 in the direction of the tool holding fixture. Consequently, the first or front end section 12 of the spindle 10 moves in the area of engagement of the tool. This arrangement permits high machining accuracy with the tool. Release of the cover element 86 of the spindlehead housing 16 also permits immediate access to the bearing points. This access is advantageous especially in assembly and maintenance operations. The cover element itself is provided with a sealing unit 88 which seals the interior of the spindle bearing 14 from the exterior. The sealing unit 88 in turn encloses the spindle 10 radially from the exterior on its front end.

The sealing device 52 is in the form of a kind of planar seal. As viewed in the longitudinal direction, this form results in very short installation lengths for the spindlehead.

While one embodiment has been chosen to illustrate the invention, it will be understood by those skilled in the art that various changes and modifications can be made therein without departing from the scope of the invention as defined in the appended claims.

What is claimed is:

1. A spindlehead, insertable into a tool disk with holders therefor, comprising:

a spindle having a front end section and a rear end section, said front end section having a chuck space for receiving a shank of a tool, said rear end section being mountable into the tool disk for rotation, said front end section being adjacent said rear end section;

a spindlehead housing including at least one spindle bearing supporting said spindle in said housing for rotation about a longitudinal axis of said spindle;

a coolant feed line in said spindle extending to said chuck space;

at least one coolant feed channel in fluid communication with said coolant feed line for conveying coolant to the tool via said coolant feed line;

a coolant drainage channel for conveying coolant from the tool; and a sealing device including at least one throttling point separated from parts of said coolant drainage channel and including first and second sealing rings extending about said spindle and being longitudinally movable within said housing coaxially along said longitudinal axis, said sealing rings being longitudinally movable to a sealing position separating said coolant feed line from said parts of said coolant drainage channel up to a specifiable leakage amount, said at least one throttling point including lubricant pouches in sealing surfaces of said sealing rings.

2. A spindlehead according to claim 1 wherein said sealing surfaces are positioned opposite said housing and are on sides of said rings facing away from one another.

3. A spindlehead according to claim 1 wherein said sealing rings are connected to said coolant feed line on sides thereof facing one another.

4. A spindlehead according to claim 1 wherein each of said sealing rings comprises an elastic seal on an external surface thereof and engaging said housing, said elastic seals exerting restoring forces on said sealing rings tending to hold said sealing rings together.

5. A spindlehead according to claim 1 wherein said at least one throttling point forms a leakage point conveying coolant therethrough.

6. A spindlehead according to claim 5 wherein said leakage point opens into said coolant drainage channel; and said coolant drainage channel extends to an exterior of said housing, at least on a tool side thereof.

7. A spindlehead according to claim 1 wherein said sealing device encircles said spindle on a side thereof remote from the tool and beyond engagement of said spindle with said at least one spindle bearing on said front end section.

8. A spindlehead according to claim 1 wherein additional seals are located in said housing longitudinally upstream and downstream of said sealing device, one of said additional seals sealing said at least one spindle bearing from said sealing device.

9. A spindlehead according to claim 1 wherein said sealing device permits dry operated tool machining without coolant.

10. A spindlehead according to claim 1 wherein said coolant feed channel extends radially in said housing and is connected to a central coolant supply connection.

* * * * *